(12) United States Patent
Dohm et al.

(10) Patent No.: US 8,892,918 B2
(45) Date of Patent: Nov. 18, 2014

(54) METHOD AND SYSTEM FOR WAKING ON INPUT/OUTPUT INTERRUPTS WHILE POWERED DOWN

(75) Inventors: Nathan J. Dohm, Natick, MA (US); Michael J. Schaffstein, Needham, MA (US)

(73) Assignee: Conexant Systems, Inc., Irvine, CA (US)

(*) Notice: Subject to any disclaimer, the term of this patent is extended or adjusted under 35 U.S.C. 154(b) by 306 days.

(21) Appl. No.: 13/285,305

(22) Filed: Oct. 31, 2011

(65) Prior Publication Data

US 2013/0106502 A1 May 2, 2013

(51) Int. Cl.
*G06F 1/26* (2006.01)
*G06F 1/32* (2006.01)

(52) U.S. Cl.
CPC ............ *G06F 1/3206* (2013.01); *G06F 1/3209* (2013.01); *G06F 1/3287* (2013.01)
USPC .......................................... 713/320; 710/260

(58) Field of Classification Search
USPC ................. 713/300–340; 710/260–269, 4
See application file for complete search history.

(56) References Cited

U.S. PATENT DOCUMENTS

| 5,708,819 | A | 1/1998 | Dunnihoo |
| 5,862,373 | A * | 1/1999 | Pathikonda et al. ......... 713/501 |
| 7,325,100 | B2 | 1/2008 | Dhiman et al. |
| 2008/0082847 | A1* | 4/2008 | Lee et al. .................... 713/323 |
| 2009/0089599 | A1* | 4/2009 | Westwick et al. ............ 713/323 |
| 2009/0204834 | A1 | 8/2009 | Hendin et al. |

* cited by examiner

*Primary Examiner* — Faisal M Zaman
*Assistant Examiner* — Kim Huynh
(74) *Attorney, Agent, or Firm* — Farjami & Farjami LLP (57) ABSTRACT

A system for power management. The system includes a plurality of input/output pads and a plurality of input/output cells, where each input/output cell is coupled to one of the input/output pads. The system further includes a plurality of interrupt observe circuits, where each interrupt observe circuit is coupled to one of the input/output cells, and where the interrupt observe circuits are configured to generate an interrupt flag during a low power mode.

19 Claims, 4 Drawing Sheets

METHOD AND SYSTEM FOR WAKING ON INPUT/OUTPUT INTERRUPTS WHILE POWERED DOWN

TECHNICAL FIELD

The disclosure generally relates to power savings processes for integrated circuits, and more specifically to a method and system for waking an integrated circuit upon receipt of a general purpose input/output interrupt.

BACKGROUND OF THE INVENTION

Standards such as EnergyStar require power limits on devices, which can include a semiconductor application-specific integrated circuit (ASIC) that must meet the low power requirements to satisfy EnergyStar standards, as well as general consumer demand.

There are many techniques for reducing power in ASICs, including using a low leakage manufacturing process, incorporating multiple voltage domains for the core logic, and powering down sections of the ASIC that are not in use. The first two techniques give up performance and increase system cost, respectively, while the third technique introduces challenges on how to wake the powered down ASIC based on external events such as a button press or network activity.

SUMMARY OF THE INVENTION

In accordance with an exemplary embodiment of the present disclosure, a system for power management is provided. The system includes a plurality of input/output pads and a plurality of input/output cells, where each input/output cell is coupled to one of the input/output pads. The system further includes a plurality of interrupt observe circuits, where each interrupt observe circuit is coupled to one of the input/output cells, and where the interrupt observe circuits are configured to generate an interrupt flag during a low power mode.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures might not be to scale and certain components can be shown in generalized or schematic form and identified by commercial designations in the interest of clarity and conciseness.

The present disclosure relates to a system and method for allowing a circuit that is in a power save mode to awake upon receipt of a GP interrupt without needing to provide a special power mesh to the GP interrupt logic and without requiring a clock. Each GP, after the boundary scan and test multiplexers, can be routed to a special GP interrupt observe ("GPIO") block that abuts the GP. Each of these GPIO-abutting blocks ("gp_abut") can be chained together with OR gates, to provide a single signal going back to the power management controller ("PMC,") which can wake up the chip when an interrupt is received. The GP which created the interrupt can be read from the interrupt observe logic by the GP interrupt logic after the chip is powered back up, to signal the processor. The interrupt observe logic can also be used for level-sensitive GP interrupt detection, even in full power mode. Edge-sensitive interrupts can be detected by the core logic using data taken directly from the pin.

The gp_abut block can combine the following
IDDQ control gate for testing leakage
Multiplexers for shared test signals
Boundary scan (JTAG) logic
A final stage of the GP client that can select multiplexers which select between firmware control and hardware control
State elements that can be used to preserve drive, output values, and pull up enable values
Interrupt observe logic The gp_abut block can be hardened and sized to match the I/O pitch so that it can be placed directly next to the I/O cell. It can take core power from the I/O cell, can use I/O voltage levels to control the gates, header cells (power gating transistors) can also be added to the gp_abut block, or other suitable features can also or alternatively be used.

The present disclosure also identifies a set of events to move a system from standby to full power, versus moving from sleep to full power. These events are called "wake-on" events.

Power savings can be accomplished by having as little of the chip active as necessary in order to sense wake-on events. Hardware can be used to perform most of the wake-on event sensing, as opposed to using the CPU, in order to achieve additional power savings. If each wake-on event can be represented as an interrupt, then the CPU can simplify its wake-up code.

Wake-on events can come in the form of some user interaction that requires a fully powered system to perform. A wake-on event might require user interaction, such as in the case of a copy operation or fax transmission. The user might not be located near the system, such as in the case of a network print operation or an incoming fax communication. Occasionally, there may be no user at all, such as in the case of scheduled operations like printer maintenance or delayed fax. In one exemplary embodiment, wake-on events can include:

User interface button press
Touch screen press
Memory card insertion and removal
WiFi traffic
Ethernet traffic
Ring detection
Extension pickup
Scheduled wake up
Delayed fax transmission
Printer maintenance
USB device traffic
USB device resume
USB device attach and detach
USB host port change Some of these wake-on events require hardware inside the ASIC to be operational, such as Ethernet logic that inspects incoming packets to determine if they are directed at the device. Some of these events (such as the first four on the list above) can be handled as simple external interrupts and thus require a scheme to wake on pin state change. Further, it is desirable for system integrators to support wake on all general purpose pins on the chip, not simply a subset which remains powered on. Handling of GPIO interrupts from these various wake-on events is discussed below.

Buttons on a user interface can be implemented in a number of ways. One way is through a button matrix. The matrix is composed of GP pins attached to columns and rows, where one of the columns is strobed and the rows are examined a response in this embodiment, the GP pins composing the row signals can flag interrupts when any button is pressed, if all columns are held in the strobe asserted state. This method can be used to flag an interrupt if any button is pressed. It is also possible to isolate a single button in the matrix as wake-on event by only asserting its column strobe GP and only arming its row GP interrupt.

Another exemplary embodiment is to connect a GP directly to a button, such as a "power" button or a "wake from low power mode" button. Again, this GP pin can be connected to an interrupt.

For wake-on events resulting from a touch screen interface, three exemplary types of touch screen technologies that can be used include resistive, surface capacitive and projected capacitive elements, each of which have different configuration requirements for detecting a wake-on type button press. Determining the touch coordinates on a touch screen can be CPU intensive. One technique to minimize the CPU overhead is to first employ a simple scan of the touch surface to determine if any area was touched, regardless of the location.

The scanning process for a resistive touch screen event utilizes a single GP pin connected to one of the terminals on the resistive touch screen, which is driven low. The screen's opposite terminal is connected to a second GP input pin with a pull up resistor and interrupt capability. Any touch of the screen will generate a high to low transition on the pin, causing an interrupt that can be used as the wake-on event.

Memory card devices have card detection signals, either though the card itself or the card connector. In an unfolded scenario, the card detection signals can be connected to GP pins, which can be attached to interrupts to cover wake-on card insertion and removal. In a folded configuration, the folding logic can expose the card detect signals to GP pins before going into the low power state for the card detection GP interrupts to fire.

In one exemplary embodiment, the gp_abut can be used with an ASIC. One instance of a gp_abut block can be used with each GPIO to create a ring around the periphery of a chip, just inside the pad ring. A latch circuit can be used to detect an interrupt state change, and the interrupt detect can be forwarded around the periphery of the chip using an OR tree. The detect signal can be processed at a region of the chip that remains powered up, and can cause a power management controller to trigger a wake up. The interrupt state can be preserved in such a manner that when firmware is restored its state, it can determine which interrupt has been asserted.

Other auxiliary functions can also or alternatively be included in the gp_abut building block, such as a constant value driver or pull-up disable during power-down. Control and Status Registers (CSRs) implementing these functions can be located in the power-down region, and a bus can be used to update a latch state in each of the gp_abut blocks when the CSRs are written, to allow these functions to work even when the CSRs are powered down. In this configuration, when power is restored, the latch state values can be fed back to the CSRs so that the CSRs appear consistent to software across the power-down.

Multiplexers for boundary scan and test sharing can also be included in the gp_abut block to simplify implementation of such functions. The gp_abut block can take core power from the abutted I/O cell, such that no special power mesh is required. Where suitable, power can be integrated into the I/O cell and the gp_abut cell can use 3.3V I/O power.

In one exemplary embodiment, the auxiliary functions mentioned above can use state retention flip flops, which require a secondary power grid and a specially designed flip flop cell that can take power from two supplies.

"Standby" mode can be the lowest power state, with minimal processing being required in order to wake up the chip into full-power mode based on a number of interrupt conditions. In order to obtain this target power, power-gating (also referred to as "power islanding") can be used in order to eliminate leakage current.

The disclosed exemplary embodiment can also include a 3.3 V power supply for input/output and analog circuits. The 3.3 V supply does not need to be power gated, as it can always be powered on. An ungated 1.8 V/1.5 V power supply can also be used for double data rate type two or three synchronous dynamic random access memory (DDR2/3) input/output circuits. The core power supply can be broken into two separate supplies: 1) a VDD supply that can always powered on, and 2) a VVDD supply that can power the majority of the core logic and be power-gated on chip. Header cells can be used in between the VDD supply and the VVDD supply.

The following exemplary power states can be defined:

P0 (Full Power Mode): CPU and memory operate at normal frequencies, some blocks may be clock gated if not in use.

P1 (Sleep Mode): Entire chip is powered. Phase-locked loops and analog blocks are running. Most blocks are clock gated, and CPU and memory is operating at minimum frequency.

P2 (Standby Plus Mode): Same as P3 except the USB Device PHY block is powered up.

P3 (Standby Mode): Lowest operational power state. SDRAM is in self-refresh, CPU and most logic on chip is powered down. All USE PHYs are powered down. All phase locked loops and most analog blocks are powered down.

P4 (Off): The system is powered off, only power draw is from the real-time clock battery.

In this exemplary embodiment, the following events can be used to wake the system from the associated power states:

P3: user interface button press (GP interrupt); resistive touch screen press (GP interrupt); memory card insertion/removal (GP interrupt); external WiFi controller (GP interrupt); scheduled wake up (RTC interrupt); fax ring detection (HSSD interrupt); Ethernet wake-on event detected; USB host port change; USB device attach & detach P2: USE device traffic; USB device resume P1: WiFi traffic (USB host or SDIO)

The following blocks can stay powered up in standby mode:

Interrupt controller USB physical logic (UTMI), or a suitable digital interface to the PHY that detects attach/detach events (the actual analog PHYs can be powered down, except in P2)

USB device and host controller

Ethernet MAC

SDIO interface for WiFi connectivity

FAX interface logic

Real time clock

Clock control block (some portion of the clock circuitry may be needed, the entire clock circuit can be located in powered-up region but partitioned)

PADS—logic around I/O including boundary scan/test c, can also ad special wake-on GP interrupt capability to this block (block can be kept free of functional clocks)

PMC—Power Management Controller

The blocks that get powered down can be placed in a special hierarchical logical level in the register-transfer level (RTL), to make it easier to ensure that the correct clocks & reset are attached to the proper blocks, and to make it easier for implementation and physical design.

A "restore-power-reset" (essentially a chip-wide soft reset) can be utilized at the top level to initiate a chip-wide reset for all clock domains. This reset does not need to affect blocks that remain powered up. Clocks will need special handling if they span both powered-up and powered-down voltage domains.

It would be preferable not to leave the GP multiplexing logic, which includes the GP interrupt logic, powered up during standby mode, because it is distributed around the chip and cannot be placed in a constrained physical block. The logic in the "pads" block can be powered up, which includes boundary scan and test multiplexers, although it is noted that this logic does not require a clock, which simplifies clock routing for standby mode.

Figure 1:
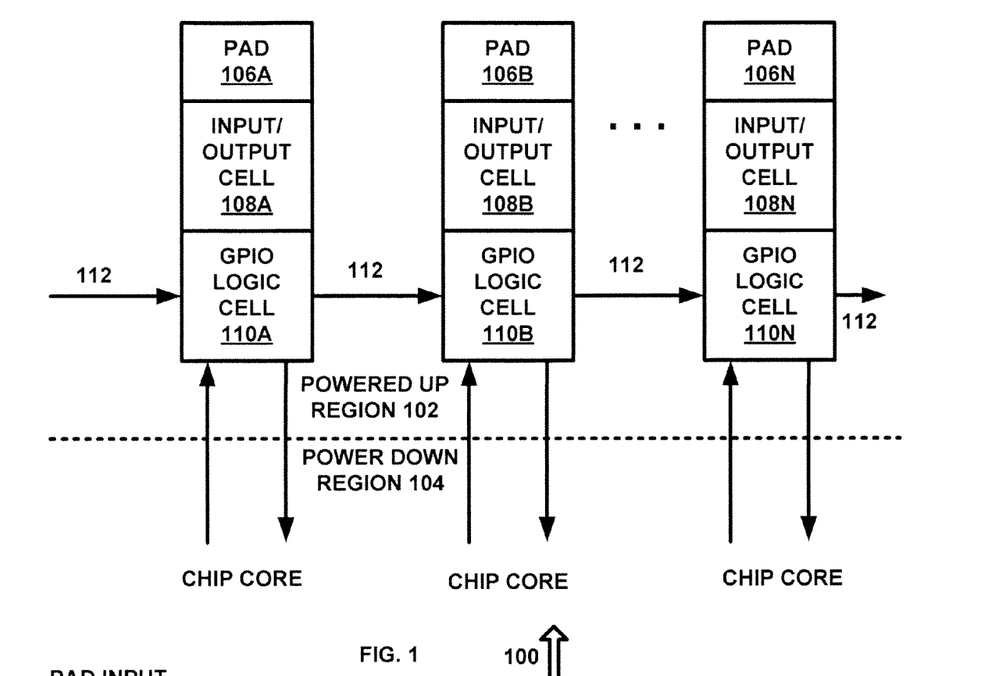
FIG. 1 is a diagram of a system for waking on GPIO interrupts while powered down in accordance with an exemplary embodiment of the present disclosure.

FIG. 1 is a diagram of a system 100 for waking on GPIO interrupts while powered down in accordance with an exemplary embodiment of the present disclosure. System 100 can be used to wake-on GP interrupts without powering the GP interrupt logic and without requiring a clock.

System 100 can be implemented in hardware or a suitable combination of hardware and software, and can be one or more software systems operating on a processing platform. As used herein, "hardware" can include a combination of discrete components, an integrated circuit, an application-specific integrated circuit ("ASIC"), a field programmable gate array ("FPGA"), or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines code or other suitable software structures operating in general purpose software application, such as an operating system, and one or more lines of code or other suitable software structures operating in a specific purpose software application.

System 100 includes pads 106A through 106N, input/output cells 108A through 108N, and GPIO logic cells 110A through 110N. Each GPIO logic cell 110A through 110N receives an interrupt detect signal line 112, which is coupled to the next GPIO logic cell 110A through 110N in series. Each GPIO logic cell 110A through 110N is located in a powered up region 102, and receives signals from and transmits signals to a chip core section located in a power down region 104.

In operation, the chip core in the power down region 104 can be in a standby mode of operation. When a change occurs on pad 106A through 106N, such as application or removal of power, the change is sensed by the associated input/output cell 108A through 108N, and an interrupt detect signal is generated by the associated GPIO logic cell 110A through 110N and can be stored to a local register or other suitable locations, and can also be transmitted over interrupt detect signal line 112. The power management controller (not explicitly shown) can then detect which pad 106A through 106N received a signal and can cause the associated chip core logic to exit the standby mode of operation handle the associated interrupt event.

Figure 2:
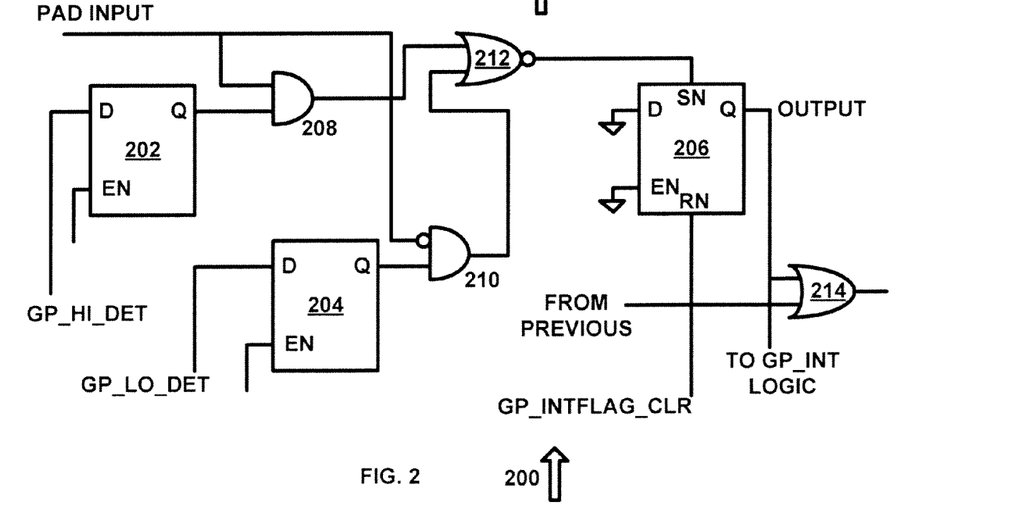
FIG. 2 is a diagram of a system for providing interrupt observe functionality in accordance with an exemplary embodiment of the present disclosure.

FIG. 2 is a diagram of system 200 for providing interrupt observe functionality in accordance with an exemplary embodiment the present disclosure. System 200 can be implemented in hardware, such as using discrete logic devices, or a suitable combination of hardware and software, such as using an FPGA, an ASIC, a digital signal processor (DSP) or other suitable combinations of hardware and software.

System 200 includes latches 202 and 204, flip flop 206, and gates 208 and 210, and or gates 212 and 214. A pad input signal is provided to and gate 208 and is inverted and provided to and gate 210. Prior to power down, the state of the pad input signal is detected, and a GP_HI_DET or GP_LO_DET signal is generated, depending on whether the state of the pad input signal is high or low. For example, if the pad input signal is high, then a GP_LO_DET signal is generated, and if the pad input signal is low, then a GP_HI_DET signal is generated. This results in the output of or gate 212 being set to zero. After power-down, the value of the output from flip flop 206 will thus be logic zero until a change in state occurs at the pad input, at which point in time flip flop 206 will transition to logic one. The output is provided to GP_INT_LOGIC to set a flag or to otherwise store the data in a register, so as to allow the circuit that generated the interrupt to be detected, and the output is also transmitted to the next interrupt observe circuit through or gate 214. Likewise, if a transition occurs at an interrupt observe circuit that is located earlier in the chain, that transition generates a high output signal that is transmitted through or gate 214 to the next interrupt observe circuit, until the signal is finally received by the power management controller. GP_INTFLAG_CLR is used to reset the state of flip flop 206.

In operation, system 200 allows the state of an input to be determined before power down, and then detects any change in that state. Thus, if an input is at a low state at power down, a change to a high state will cause an interrupt signal to be generated, and if an input is at a high state at power down, a change to a low state will cause an interrupt signal to be generated. System 200 also allows a flag to be stored to allow the input that resulted in the generation of the interrupt to be subsequently detected, such that a single interrupt detect line can be used in conjunction with a plurality of interrupt detect cells.

Figure 3:
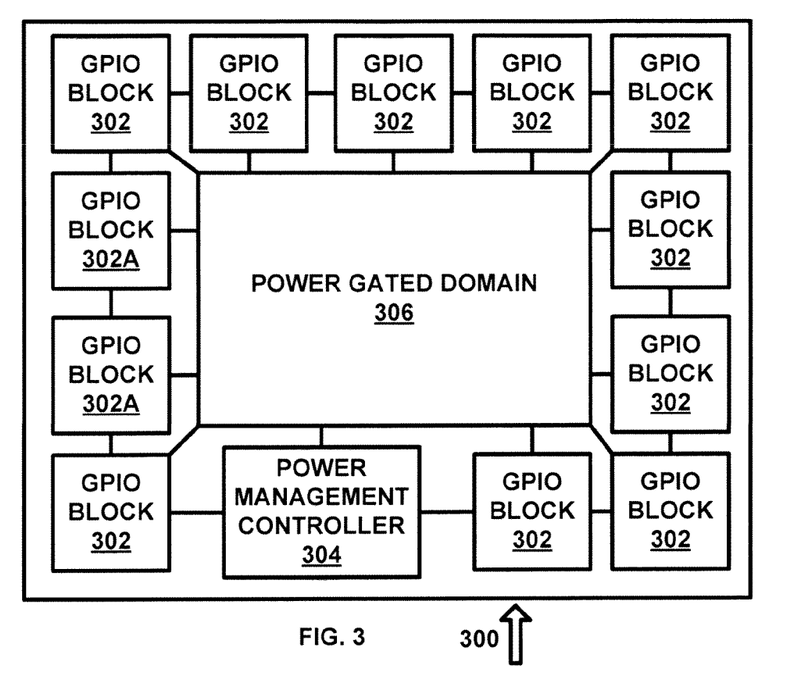
FIG. 3 is a diagram of a system for providing for General Purpose Input/Output (GPIO) functionality in accordance with an exemplary embodiment of the present disclosure.

FIG. 3 is a diagram of a system 300 for providing for GPIO functionality in accordance with an exemplary embodiment of the present disclosure. System 300 includes a plurality of GPIO blocks 302, each of which is coupled to the adjacent GPIO blocks 302 or to power management controller 304, if power management controller 304 is adjacent. Each GPIO block 302 is also coupled to power gated region 306, and provides an input to core logic circuitry within power gated region 306.

In operation, each GPIO block 302 receives an input that is either in a high state or a low state prior to system 300 going into a standby power state. Power management controller 304 or other suitable circuitry determines the state of each input and sets the associated GPIO block 302 for that input state. After system 300 has entered the standby power state, a change in input state at any GPIO block 302 is propagated (clockwise or counterclockwise) from that GPIO block 302 to power management controller 304. The GPIO block 302 that changed state can also set a flag in a predetermined local register or in other suitable manners to allow power management controller 304 to determine the GPIO block that generated the interrupt. Power opted region 306 is then brought out of standby as required to support the condition that generated the interrupt, and the GPIO blocks 302 and flag registers can then be reset to allow system 300 to re-enter standby power mode.

Figure 4:
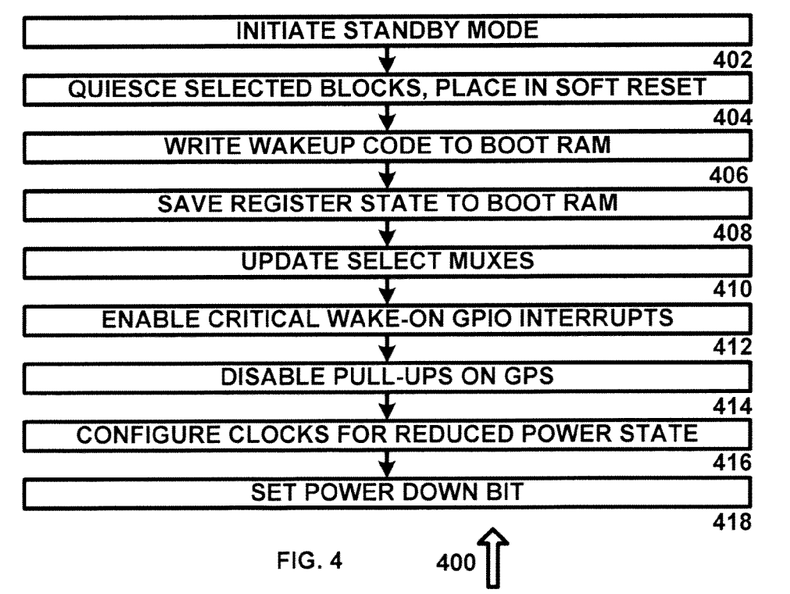
FIG. 4 is a diagram of algorithm for entering a standby mode in accordance with an exemplary embodiment of the present invention.

FIG. 4 is a diagram of algorithm 400 for entering a standby mode in accordance with an exemplary embodiment of the present invention. Algorithm 400 can be implemented as program code operating on a processor, such as a general purpose processor, an ASIC, an FPGA, a DSP or other suitable processors.

Algorithm 400 begins at 402, where standby mode is initiated. In one exemplary embodiment, a power management controller or other suitable systems can determine that a system has been inactive for a predetermined period of time or that other conditions indicate that standby mode should be initiated, and standby mode processing can be initiated. The algorithm then proceeds to 404.

At 404, selected power blocks are set to a quiescent state and placed into soft reset. Blocks such as the CPU can remain unaffected at this time. The algorithm then proceeds to 406.

At 406, wake up code is written to the boot RAM. In one exemplary embodiment, the wake up code can include clock setup code, DRAM setup code, jump code to operating system code in DRAM and other suitable code. The algorithm then proceeds to 408.

At 408, predetermined register states are saved. In one exemplary embodiment, client selections, interrupt configurations and other suitable registers are saved to DRAM, to power management controller boot RAM, or to other suitable memory locations. The algorithm then proceeds to 410.

At 410, client select multiplexers are updated so that all GPIO circuits are configured for detecting a change in input/output state, such as described above. The algorithm then proceeds to 412.

At 412, predetermined interrupt states are set to prevent the system from being taken out of standby mode for non-critical interrupt. The algorithm then proceeds to 414 where pull-up for general purpose input/output ports is disabled. The algorithm then proceeds to 416 where the clock settings are configured for the standby power state, such as to reduce power usage by clock circuitry for systems that are in standby mode.

The algorithm then proceeds to 418, where the power down bit is set in the power management controller or other suitable systems.

In operation, algorithm 400 allows gp_abut blocks to be used to place a circuit into standby mode, by configuring interrupt settings based on current input states and by setting interrupt logic to recognize critical interrupt events. Algorithm 400 thus provides flexibility in setting interrupt states based on circuit-specific designs.

Figure 5:
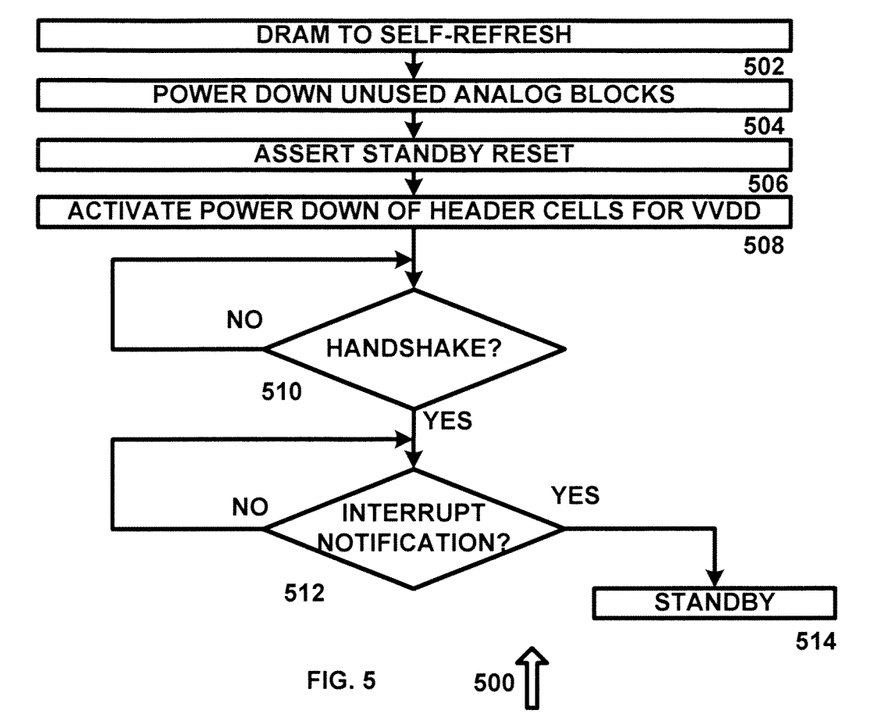
FIG. 5 is a diagram of an algorithm for a hardware standby sequence in accordance with an exemplary embodiment of the present invention.

FIG. 5 is a diagram of an algorithm 500 for a hardware standby sequence in accordance with an exemplary embodiment of the present invention. Algorithm 500 can be implemented as program code operating on a processor, such as a general purpose processor, an ASIC, an FPGA, a DSP or other suitable processors.

Algorithm 500 begins at 502, where DRAM is set to a self-refresh mode of operation. The algorithm then proceeds to 504 where unused analog blocks, input/output blocks, phase locked loops and other suitable components are powered down. The algorithm then proceeds to 506.

At 506, a standby reset control is asserted, and the algorithm proceeds to 508 where the power down of header cells for VVDD is activated. The algorithm then proceeds to 510 where it is determined whether a handshake has been received from all power down cells. If all cells have not reported, the algorithm returns to 510, otherwise the algorithm proceeds to 512, where it is determined whether an interrupt notification has been received. If interrupt notification has not been received, the algorithm returns to 512, otherwise the algorithm proceeds to 514 where the system enters standby.

In operation, algorithm 500 allows gp_abut blocks to be used to support a hardware standby sequence, by allowing unused analog blocks and input/output cells to be powered down. Algorithm 500 thus provides flexibility in setting interrupt states based on circuit-specific designs.

Figure 6:
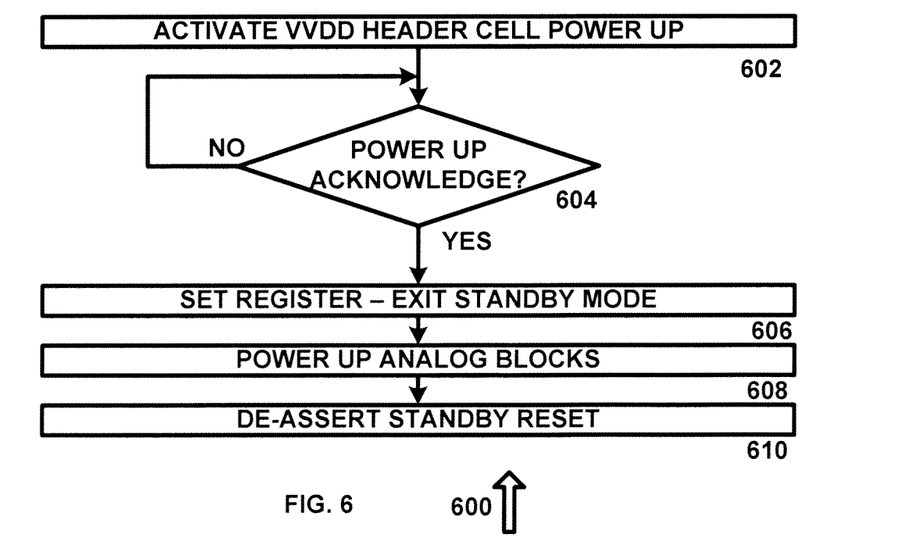
FIG. 6 is a diagram of an algorithm for a hardware full power restore sequence in accordance with an exemplary embodiment of the present invention.

FIG. 6 is a diagram of an algorithm 600 for a hardware full power restore sequence in accordance with an exemplary embodiment of the present invention. Algorithm 600 can be implemented as program code operating on a processor, such as a general purpose processor, an ASIC, an FPGA, a DSP or other suitable processors.

Algorithm 600 begins at 602, where power-up of header cells for VVDD is activated. The algorithm then proceeds to 604 where it is determined whether a power up acknowledge has been received from the header cell chain. If power up acknowledge has not been received, the algorithm returns to 604, otherwise the algorithm proceeds to 606 where a register bit is set to indicate that standby mode is being exited. The algorithm then proceeds to 608.

At 608, power is restored to analog blocks, input/output blocks, phase locked loops and other suitable components. The algorithm then proceeds to 610 where standby reset mode is de-asserted.

In operation, algorithm 600 allows gp_abut blocks to be used to support a hardware restore sequence. Algorithm 600 thus provides flexibility in setting interrupt states based on circuit-specific designs.

Figure 7:
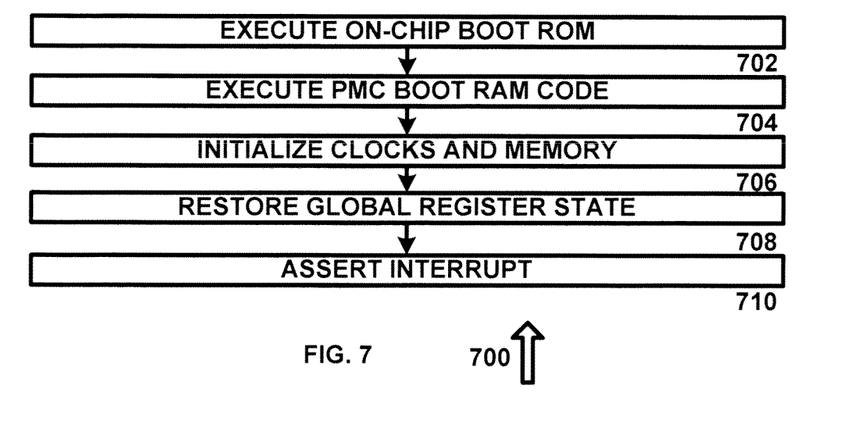
FIG. 7 is a diagram of an algorithm for a firmware full power restore sequence in accordance with an exemplary embodiment of the present invention.

FIG. 7 is a diagram of an algorithm 700 for a firmware full power restore sequence in accordance with an exemplary embodiment of the present invention. Algorithm 700 can be implemented as program code operating on a processor, such as a general purpose processor, an ASIC, an FPGA, a DSP or other suitable processors.

Algorithm 700 begins at 702, where on-chip boot ROM code is executed. In one exemplary embodiment, the boot ROM code can check a power management controller status bit to determine whether standby mode has been exited. If it is determined that standby mode has been exited, then boot code from the power management controller boot RAM or other suitable code can be executed, such as instead of external boot code. The algorithm then proceeds to 706.

At 706, clocks and memory can be initialized based on power management boot sequence settings. The algorithm then proceeds to 708, where global register states are reset. The algorithm then proceeds to 710, where it is determined which interrupt was asserted and the associated service is invoked.

In operation, algorithm 700 allows gp_abut blocks to be used to support a firmware restore sequence, including the identification of the gp_abut cell that generated the interrupt. Algorithm 700 thus provides flexibility in setting interrupt states based on circuit-specific designs.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for power management comprising:
   A plurality of input/output pads;
   A plurality of input/output cells, each input/output cell coupled to one of the input/output pads; and
   a plurality of interrupt observe circuits, each interrupt observe circuit coupled to one of the input/output cells, where the interrupt observe circuits are configured to generate an interrupt flag during a low power mode, and wherein each of the interrupt observe circuits comprises:
   a high detect circuit configured to change a state of the interrupt observe circuit if a signal received at the input/output pad associated with the interrupt observe circuit changes from a low state to a high state;
   a low detect circuit configured to change a state of the interrupt observe circuit if a signal received at the input/output pad associated with the interrupt observe circuit changes from a high state to a low state;
   a first OR gate coupled to the high detect circuit and the low detect circuit; and
   a second OR gate configured to receive a signal from an adjacent interrupt observe circuit and an output from the interrupt observe circuit and to generate an output; and
   wherein each of the plurality of interrupt observe circuits is coupled to core logic, wherein the core logic is configured to set a state of the plurality of interrupt observe circuits based on an input to the input/output pad associated with each of the interrupt observe circuits when the core logic circuit transitions from a full power mode to a low power mode.

2. The system of claim 1 wherein one or more of the interrupt observe circuits are coupled to an adjacent interrupt observe circuit through an OR gate.

3. The system of claim 1 where one or more of the interrupt observe circuit includes a high detect circuit configured to change a state of the interrupt observe circuit if a signal received at the input/output pad associated with the interrupt observe circuit changes from a low state to a high state.

4. The system of claim 1 where one or more of the interrupt observe circuit includes a low detect circuit configured to change a state of the interrupt observe circuit if a signal received at the input/output pad associated with the interrupt observe circuit changes from a high state to a low state.

5. The system of claim 1 where one or more of the interrupt observe circuits includes an or gate configured to receive a signal from an adjacent interrupt observe circuit and an output from the interrupt observe circuit and to generate an output.

6. The system of claim 1 further comprising a power management controller coupled to one or more of the interrupt observe circuits, the power management controller configured to receive an interrupt signal and to cause an associated core logic circuit to exit a low power state.

7. A method for power management comprising:
   receiving an input at each of a plurality of input/output pads prior to entering a low power mode;
   generating a signal for each of the plurality of input/output pads as a function of the input, using associated input observe circuitry;
   determining with the input observe circuitry whether the input at one of the plurality of input/output pads has changed after entering the low power mode; modifying the signal for the associated input/output pad as a function of the changed input using the input observe circuitry; and
   wherein each of the interrupt observe circuits comprises:
   a high detect circuit configured to change a state of the interrupt observe circuit if a signal received at the input/output pad associated with the interrupt observe circuit changes from a low state to a high state;
   a low detect circuit configured to change a state of the interrupt observe circuit if a signal received at the input/output pad associated with the interrupt observe circuit changes from a high state to a low state;
   a first OR gate coupled to the high detect circuit and the low detect circuit; and
   a second OR gate configured to receive a signal from an adjacent interrupt observe circuit and an output from the interrupt observe circuit and to generate an output; and
   wherein each of the plurality of interrupt observe circuits is coupled to core logic, wherein the core logic is configured to set a state of the plurality of interrupt observe circuits based on an input to the input/output pad associated with each of the interrupt observe circuits when the core logic circuit transitions from a full power mode to a low power mode.

8. The method of claim 7 wherein generating the signal for each of the plurality of input/output pads as the function of the input, using associated input observe circuitry comprises generating the signal for each of the plurality of input/output pads as the function of the input, using a separate associated input observe circuit for each of the input/output pads.

9. The method of claim 7 wherein determining with the input observe circuitry whether the input at one of the plurality of input/output pads has changed after entering the low power mode comprises determining whether the input has changed from a high state to a low state or from a low state to a high state using a flip flop.

10. The method of claim 7 wherein determining with the input observe circuitry whether the input at one of the plurality of input/output pads has changed after entering the low power mode comprises determining whether the input has changed from a high state to a low state using low detect circuitry or from a low state to a high state using high detect circuitry.

11. The method of claim 7 further comprising transmitting the modified signal to a power management controller.

12. The method of claim 7 further comprising transmitting the modified signal to a power management controller through one or more intervening input observe circuits.

13. The method of claim 7 wherein receiving the input at each of the plurality of input/output pads prior to entering the low power mode further comprises setting a state of the associated input observe circuitry for each of the plurality of input/output pads.

14. The method of claim 7 further comprising storing a flag value in a register associated with the changed input.

15. A system for power management comprising:
a plurality of input/output pads;
a plurality of input/output cells, each input/output cell coupled to one of the input/output pads; and
means for generating an interrupt signal during a low power mode, and wherein each of a interrupt observe circuits comprises:
a high detect circuit configured to change a state of the interrupt observe circuit if a signal received at the input/output pad associated with the interrupt observe circuit changes from a low state to a high state;
a low detect circuit configured to change a state of the interrupt observe circuit if a signal received at the input/output pad associated with the interrupt observe circuit changes from a high state to a low state;
a first OR gate coupled to the high detect circuit and the low detect circuit; and
a second OR gate configured to receive a signal from an adjacent interrupt observe circuit and an output from the interrupt observe circuit and to generate an output; and
wherein each of the plurality of interrupt observe circuits is coupled to core logic, wherein the core logic is configured to set a state of the plurality of interrupt observe circuits based on an input to the input/output pad associated with each of the interrupt observe circuits when the core logic circuit transitions from a full power mode to a low power mode.

16. The system of claim 15 further comprising means for transmitting the interrupt signal to a power management controller, further comprising six intervening GPIO logic blocks.

17. The system of claim 15 further comprising a power management controller configured to receive the interrupt signal and to cause an associated core logic circuit to exit a low power state.

18. The system of claim 15 further comprising means for configuring interrupt observe circuitry, further comprising a flip flop in an interrupt observe circuit for each input/output pad, the flip flop configured to store a value being received at the associated input output pad prior to entering a low power state and to generate a signal if the value changes while the input output pad is in the low power state.

19. The system of claim 15 further comprising means for receiving the interrupt signal and causing an associated core logic circuit to exit a low power state.

* * * * *